US008588344B2

(12) United States Patent
Ray et al.

(10) Patent No.: US 8,588,344 B2
(45) Date of Patent: Nov. 19, 2013

(54) DETECTING THE MODULATION TYPE AND/OR CONSTELLATION ORDER OF A PSK/QAM-MODULATED SIGNAL

(75) Inventors: Baijayanta Ray, Bangalore (IN); Abhay Samant, Bangalore (IN)

(73) Assignee: National Instruments Corporation, Austin, TX (US)

(*) Notice: Subject to any disclaimer, the term of this patent is extended or adjusted under 35 U.S.C. 154(b) by 359 days.

(21) Appl. No.: 13/109,338

(22) Filed: May 17, 2011

(65) Prior Publication Data

US 2012/0027065 A1 Feb. 2, 2012

(30) Foreign Application Priority Data

Jul. 30, 2010 (IN) ............................ 1794/DEL/2010

(51) Int. Cl.
*H04L 27/22* (2006.01)
(52) U.S. Cl.
USPC ........................... 375/332; 375/261; 375/324
(58) Field of Classification Search
USPC .......... 375/261, 279, 280, 281, 324, 329, 332
See application file for complete search history.

(56) References Cited

U.S. PATENT DOCUMENTS

| 6,614,851 B1 * | 9/2003 | Dehghan et al. | 375/261 |
| 7,428,270 B1 * | 9/2008 | Dubuc et al. | 375/316 |
| 2002/0041639 A1 * | 4/2002 | Krupezevic et al. | 375/324 |
| 2007/0230599 A1 * | 10/2007 | Koga et al. | 375/260 |
| 2010/0098193 A1 * | 4/2010 | Liu et al. | 375/332 |

OTHER PUBLICATIONS

Decision tree learning, from Wikipedia, the free encyclopedia, http://en.wikipedia.org/wiki/Decision_tree_learning, 5 pages. [Retrieved Nov. 1, 2011].
Phase-shift keying, from Wikipedia, the free encyclopedia, http://en.wikipedia.org/wiki/Phase-shift_keying, 14 pages. [Retrieved Nov. 1, 2011].
Quadrature amplitude modulation, from Wikipedia, the free encyclopedia, http://en.wikipedia.org/wiki/Quadrature_amplitude_modulation, 7 pages. [Retrieved Nov. 1, 2011].
Skewness, from Wikipedia, the free encyclopedia, http://en.wikipedia.org/wiki/Skewness, 5 pages. [Retrieved Nov. 1, 2011].
Ankit Sethi, et al., "Blind Carrier/Timing Recovery and Detection of Modulation Scheme," U.S. Appl. No. 12/977,491, filed Dec. 23, 2010, 59 pages.

* cited by examiner

*Primary Examiner* — Betsy Deppe
(74) *Attorney, Agent, or Firm* — Meyertons Hood Kivlin Kowert & Goetzel, P.C.; Jeffrey C. Hood; Mark K. Brightwell

(57) ABSTRACT

A system and method for determining the modulation type and constellation order of an input signal given that the modulation type and constellation order are known to belong to set of possible types/orders. A computer operates on samples of the input signal to compute signal features. The computer classifies the modulation type and the constellation order by comparing each feature to one or more corresponding threshold values. The results of the comparisons are used to determine the modulation type and constellation order of the input signal from the set of possible types/orders. The classification may be performed based on a decision tree, each leaf node of the decision tree corresponding to a type/order combination, and each non-leaf node corresponding to one or more of the comparisons. The set of possible types/order may include PSK with a number of different constellation orders and QAM with a number of different constellation orders.

21 Claims, 6 Drawing Sheets

DETECTING THE MODULATION TYPE AND/OR CONSTELLATION ORDER OF A PSK/QAM-MODULATED SIGNAL

RELATED APPLICATION DATA

This application claims the benefit of priority under 35 U.S.C. 119 to Indian Provisional Application No. 1794/DEL/2010, filed with the Patent Office of India on Jul. 30, 2010, titled "Various Receiver Systems and Methods", and invented by Baijayanta Ray, Nikhil Ashok Deshmukh, Pratik Prabhanjan Brahma, Ankit Sethi, Kunal Agarwal, Sartaj Chaudhury, and Utkarsh Gupta. That Provisional Application is hereby incorporated by reference in its entirety as though fully and completely set forth herein.

FIELD OF THE INVENTION

The present invention relates to the field of telecommunication, and more particularly, to systems and methods for determining the modulation type and/or constellation order implicit in a received input signal.

DESCRIPTION OF THE RELATED ART

A receiver receives a signal transmitted by a transmitter. The receiver may not know the modulation type or constellation order used by the transmitter to generate the signal. Thus, the receiver may display the signal to a user and allow the user to estimate the modulation type or constellation order implicit in the input signal. Based on that estimate, the receiver may demodulate the input signal. However, it would be of great benefit if the receiver could be programmed to determine the modulation type and constellation order automatically, based on an analysis of the samples of the input signal.

SUMMARY

A method for classifying the modulation type of an input signal may involve the following operations.

The method may include receiving samples $\{y(n)\}$ of the input signal. The samples may be captured by an analog-to-digital converter of a receiver.

The method may also include computing a sixth order cumulant $C_{63}$ of the samples $\{y(n)\}$.

The method may also include computing a skewness of a first sequence relative to a frequency index j. The $j^{th}$ term of the first sequence is determined by a correlation sum with respect to index k between $Y'(k+P,j)$ and $Y'(k,j)$, where $Y'(k,j)$ is a magnitude spectrum derived from an initial spectrum $B'(k,j)$ of the form $|DFT\{y^4(n+kN/2P)\}|$ by zeroing a maximum element from the initial spectrum, DFT denotes a discrete Fourier transformation. N is the number of the samples $\{y(n)\}$, and P is a positive integer less than N, e.g., a factor of N. For example, in one embodiment the first sequence is given by $\{E_k[Y'(k+P,j)Y'(k,j)^*]\}$, where $E_k$ denotes an expected value relative to the index k.

The method may also include comparing the sixth order cumulant $C_{63}$ and the skewness to respective thresholds to obtain respective comparison results.

The method may also include classifying the modulation type of the input signal as being either BPSK or a member of a set S of modulation types. The set S includes a plurality of PSK and QAM modulation types but does not include BPSK. The classification is based on the comparison results.

Another method for classifying the modulation type of an input signal may involve the following operations.

The method may include receiving samples $\{y(n)\}$ of the input signal.

The method may also include computing a normalized variance of a first sequence relative to an index j. The $j^{th}$ term of the first sequence is determined by a correlation sum with respect to index k between $Y'(k+P,j)$ and $Y'(k,j)$, where $Y'(k,j)$ is a magnitude spectrum derived from an initial spectrum $B'(k,j)$ of the form $|DFT\{y^4(n+kN/2P)\}|$ by zeroing a maximum element from the initial spectrum. For example, in one embodiment the first sequence is given by $\{E_k[Y'(k+P,j)Y'(k,j)^*]\}$.

The method may also include computing a variance of a second sequence, wherein the second sequence is determined by an absolute value of a phase difference between a fourth power of a current sample of the input signal and a fourth power of a previous sample of the input signal.

The method may also include comparing the normalized variance of the first sequence and the variance of the second sequence to respective thresholds to obtain respective comparison results.

The method may also include classifying the modulation type of the input signal as being one of QPSK, 8 PSK or 16 QAM based on the comparison results.

Yet another method for classifying the modulation type of an input signal may involve the following operations.

The method may include receiving samples $\{y(n)\}$ of the input signal.

The method may also include computing a measure of peak sharpness for a distribution given by a first sequence of numbers with respect to an index j. The $j^{th}$ term of the first sequence is determined by a correlation sum with respect to index k between $Y'(k+P,j)$ and $Y'(k,j)$, where $Y'(k,j)$ is a magnitude spectrum derived from an initial spectrum $B'(k,j)$ of the form $|DFT\{y^4(n+kN/2P)\}|$ by zeroing a maximum element from the initial spectrum. For example, in one embodiment the first sequence is given by $\{E_k[Y'(k+P,j)Y'(k,j)^*]\}$.

The method may also include computing a normalized variance of a fourth power of a magnitude spectrum of the samples $\{y(n)\}$.

The method may also include comparing the measure of peak sharpness to a first threshold to obtain a first comparison result.

The method may also include comparing the normalized variance to a second threshold to obtain a second comparison result, and comparing the normalized variance to a third threshold to obtain a third comparison result.

The method may also include classifying the modulation type of the input signal as being one of 32QAM, 64QAM, 128QAM or 256QAM based on the first, second and third comparison results.

BRIEF DESCRIPTION OF THE DRAWINGS

A better understanding of the present invention can be obtained when the following detailed description of the preferred embodiments is considered in conjunction with the following drawings.

Figure 1:
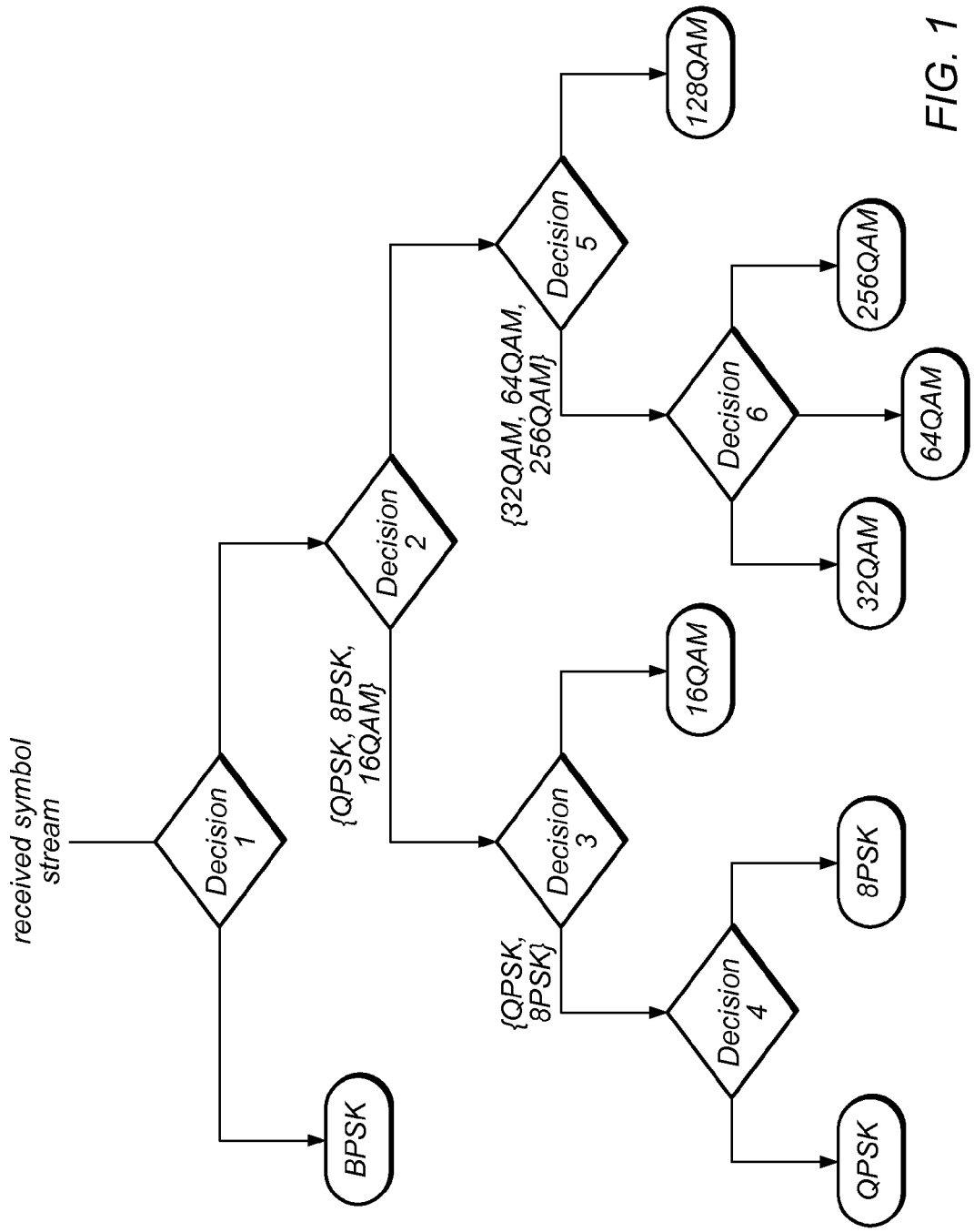
FIG. 1 illustrates one embodiment of a decision tree for classifying the modulation type and constellation order of a received input signal.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as a receiver (e.g., an RF receiver) or a receiver front end, a signal processing board, a modem, a network interface (e.g., a wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning. The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a network appliance, an Internet appliance, a hand-held or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

The embodiments disclosed herein may be realized in any of various forms. For example, any of the embodiments disclosed herein may be realized in terms of a computer-implemented method, a computer-readable memory medium, or a computer system. Furthermore, any of the embodiments disclosed herein may be realized using one or more custom-designed hardware devices such as ASICs and/or one or more programmable hardware elements such as FPGAs.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer, a computer integrated in a head-mounted display, etc.

In some embodiments, a set of computers distributed across a computer network may be configured to partition the effort of executing a computational method (e.g., any of the method embodiments disclosed herein).

In some embodiments, a first computer may be configured to receive a modulated signal, down-convert the modulated signal to baseband, and capture samples of the baseband signal. The first computer may send the captured samples to a second computer through the computer network. The second computer may operate on the signal samples according to any of the method embodiments described herein, or, any combination of the method embodiments described herein, or, any subset of any of the method embodiments described herein, or, any combination of such subsets.

The following is a list of acronyms used herein.
BPSK Binary Phase Shift Keying
CFO Carrier Frequency Offset
DFT Discrete Fourier Transform
FFT Fast Fourier Transform
IID Independent and Identically Distributed
LAN Local Area Network
N-PSK PSK with Constellation Order N
N-QAM QAM with Constellation Order N
PSK Phase Shift Keying
QAM Quadrature Amplitude Modulation
QPSK Quadrature Phase Shift Keying
RAM Read-Write Memory
ROM Read-Only Memory
SNR Signal to Noise Ratio Various embodiments described herein aim at determining the modulation scheme and/or constellation order of a received baseband signal. In some embodiments, the received signal is assumed to satisfy one or more of the following assumptions. (1) The received signal has been transmitted through a flat-fading channel with an arbitrary phase offset. (2) The received signal is sampled at baud rate. (3) The received signal is corrupted by additive white Gaussian noise. (4) The received signal is a stream of independent and identically distributed (IID) symbols modulated with one of the following Phase shift Keying (PSK) or Quadrature Amplitude Modulation (QAM) schemes: BPSK, QPSK, 8PSK, 16 QAM, 32 QAM, 64 QAM, 128 QAM and 256 QAM.

In the presence of noise and phase offset in the received signal, error vector magnitude (EVM) minimization or other common template-based clustering methods will not provide reliable detection results. To overcome this limitation, a novel method for determining the constellation order (and modulation type) of the received signal is disclosed herein. This method utilizes multiple criteria and may be interpreted as a decision-theoretic classification method. The classification tree for one set of embodiments of the method is shown in FIG. 1. In one embodiment, the classification method yields consistently correct classification-results at 10 dB SNR using 50,000 symbols.

The classification method illustrated in FIG. 1 involves a hierarchical system of decisions. Each decision is based on a corresponding criterion (feature) and corresponding threshold(s). (The received signal may be normalized to have a mean power of unity as an initial step prior to extracting features.)

Decision 1: BPSK vs. Not BPSK

If the sixth order cumulant $C_{63}$ of the received signal is greater than or equal to a threshold $T_1$ (i.e., $C_{63} \leq T_1$), the modulation type is classified as being BPSK, i.e., PSK with constellation order two. In one embodiment, the sixth order cumulant $C_{63}$ may be defined as:

$$C_{63} = E[|y(n)|^6] - 6(E[|y(n)|^2])^3 - 9E[|y(n)|^2](E[|y(n)|^4] - 2|E[y(n)|^2]|^2 - (E[|y(n)|^2])^2)'$$

where $\{y(n)\}$ is the received sample sequence, where E denotes the expectation operator. The cumulants of a distribution are determined by the moments of that distribution. Moments are related to the shape of the distribution. The expectation E[a(n)] of a sequence $\{a(n)\}$ may be computed by taking an average of the values a(n) over the index n. The notation |z| denotes the absolute value of complex number z. If the sixth order cumulant $C_{63}$ is less than the threshold $T_1$, the modulation type is classified as not being BPSK.

Decision 2: {QPSK, 8PSK, 16QAM} vs. Not {QPSK, 8PSK, 16QAM}

This decision involves the following operations.

a) Partition the received signal sequence {y(n), n=0, 1, 2, ..., N−1} into 2P subsets as follows. For k=0, 1, 2, ..., 2P−1, define subset $A_k$ as $$A_k = \left\{ y'(k,n) = y\left(k\frac{N}{2P} + n\right), n = 0, 1, \ldots, \frac{N}{2P} - 1 \right\},$$

Index k is the subset index.

b) Compute $B'(k,j) = |FFT_{N/2P}\{(y'(k,n))^4\}|$, where j is a frequency index. Note that the Fourier Transformation of a function of time n by definition produces a function of frequency j.

c) Compute Y'(k,j) by locating the maximum element in B'(k,j) as a function of index j and then setting that element equal to zero.

d) Compute $\text{Skewness}_j\{E_k[Y'(k+P,j)Y'(k,j)^*]\}$. The notation $E_k$ indicates that the expectation is to be computed with respect to index k. $\text{Skewness}_j$ denotes that the skewness is to be computed with respect to index j. Skewness is a statistical parameter that is well known those of ordinary skill in the art of signal processing. In one embodiment, the skewness of a random variable X may be defined as $$\text{Skewness}(X) = E\left[\left(\frac{X-\mu}{\sigma}\right)^3\right] = \frac{\mu_3}{\sigma^3}.$$

where μ denotes the mean of X, where σ denotes the standard deviation of the random variable X, where $\mu_3$ denotes the third moment about the mean. Skewness is a measure of the asymmetry of the probability distribution corresponding to X. Positive skewness implies that the right tail of the PDF is longer. Negative skewness means that the left tail of the PDF is longer.

e) If $\text{Skewness}_j\{E_k[Y'(k+P,j)Y'(k,j)^*]\}$ is less than a threshold $T_2$, the modulation type is classified as belonging to the subset {QPSK, 8PSK, 16QAM}. Otherwise, the modulation type is classified as not belonging to the subset {QPSK, 8PSK, 16QAM}.

Decision 3: {QPSK, 8PSK} vs. 16QAM

Compute $\text{Var}_j\{E_k[Y'(k+P,j)(Y'(k,j))^*]\}$, where $\text{Var}_j$ denotes the variance with respect to index j. Normalize the variance value by dividing the variance value by the mean value, i.e., by $E_j\{E_k[Y'(k+P,j)(Y'(k,j))^*]\}$. If the normalized variance is less than a threshold $T_3$, the modulation type is classified as belonging to the subset {QPSK,8PSK}. Otherwise, the modulation type is classified as not belonging to the subset {QPSK, 8PSK}.

Decision 4: QPSK vs. 8PSK

Compute $\text{Var}_n\{(2|\arg(y^4(n)(y^4(n-1))^*)|)\%(2\pi)\}$, where $\text{Var}_n$ denotes the variance with respect to index n, where "%(2π)" means "modulo 2π", where arg(z) denotes the angle associated with the complex number z. If the computed variance value is less than a threshold $T_4$, the modulation type is classified as being QPSK. Otherwise, the modulation type is classified as being 8 PSK.

Decision 5: {32QAM, 64QAM, 256QAM} vs 128QAM

Compute kurtosis$_j\{E_k[Y'(k+P,j)(Y'(k,j))^*]\}$, where kurtosis denotes that the kurtosis is to be computed with respect to index j. If the computed kurtosis value is greater than or equal to a threshold $T_5$, the modulation type is classified as being 128 QAM. Otherwise, the modulation type is classified as being a member of the subset {32QAM, 64QAM, 256QAM}.

The kurtosis of a sequence of real numbers may be defined as $\mu_4/\sigma^4-3$, where $\mu_4$ is the fourth moment about the mean and $\sigma$ is the standard deviation of the population given by the sequence of real numbers. Kurtosis is a measure of how sharply peaked the PDF of the population is. In alternative embodiments, measures of peak sharpness other than kurtosis may be used.

Decision 6: 32QAM vs. 64QAM vs. 256QAM

Compute Normalized $Var_j\{|FFT\{y(n)\}|^4\}$. Normalization means dividing by the mean of $\{|FFT\{y(n)\}|^4\}$ over the frequency index j. (Recall that the Fourier transformation of any function of time n naturally produces a function of frequency j.) If the normalized variance is greater than a threshold $T_6$, the modulation type is classified as being 32 QAM. If the normalized variance is less than a threshold $T_7$, the modulation type is classified as being 256 QAM. If neither of the previous conditions is satisfied, the modulation type is classified as being 64 QAM.

The values of the thresholds $T_1$ through $T_7$ may be determined by experimentation. In one embodiment, the thresholds are set as follows: $T_1=4.6$, $T_2=0.9$, $T_3=0.09$, $T_4=2.27$, $T_5=16$, $T_6=59$ and $T_7=50$. However, each of the thresholds may vary within a corresponding range of variation. In some embodiments, the computer system may allow the user to adjust any or all of the thresholds.

FIG. 1 represents one possible embodiment. A wide variety of other embodiments are contemplated. For example, any subtree of the decision tree shown in FIG. 1 may be the basis of a corresponding embodiment.

Figure 2:
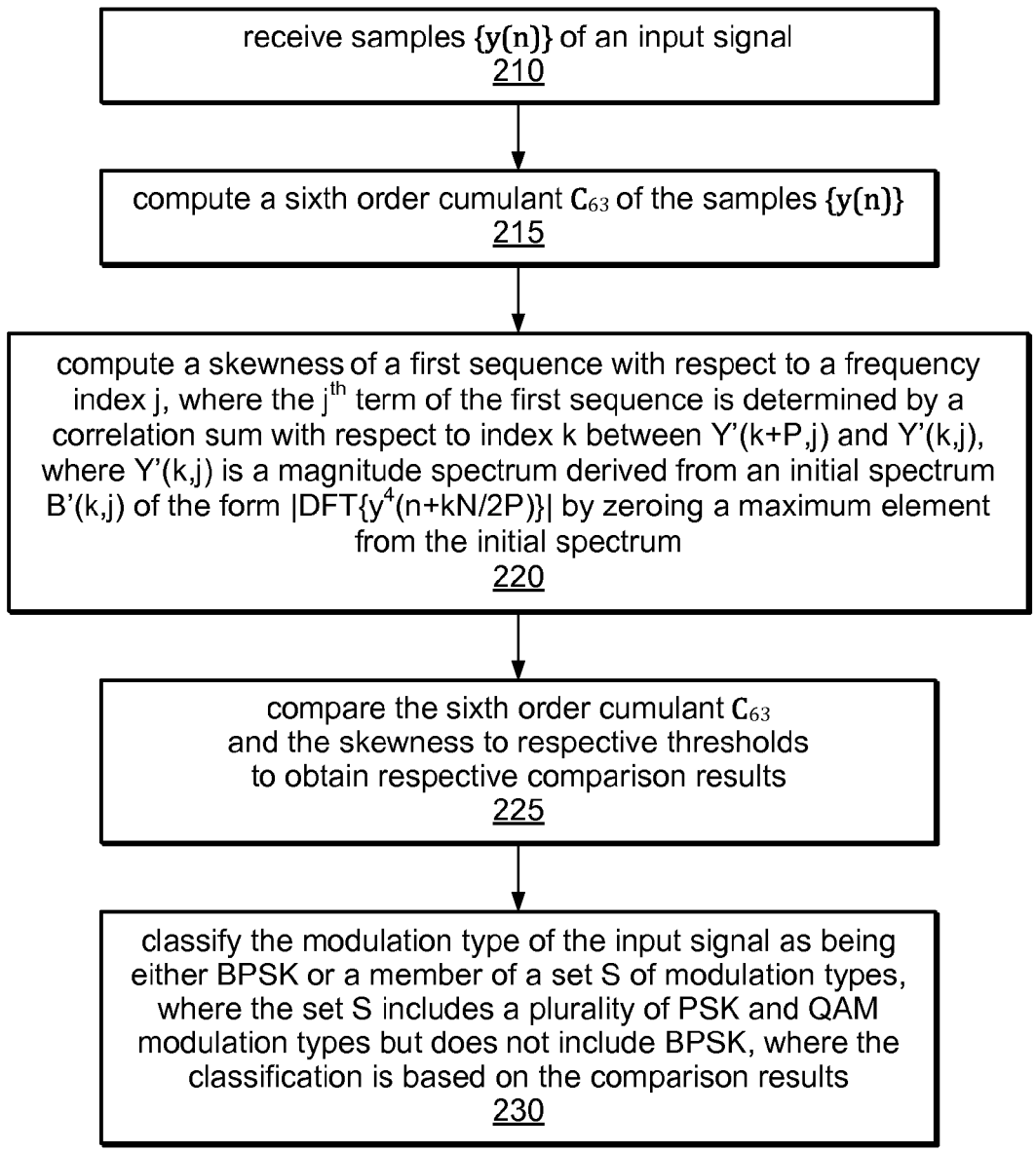
FIG. 2 illustrates one embodiment of a method for classifying the modulation type and constellation order of a received input signal.

In one set of embodiments, a method for classifying the modulation type of an input signal involves the operations shown in FIG. 2. The method may be performed by a computer system (e.g., any of the various computer systems described herein).

At 210, the computer system receives samples $\{y(n)\}$ of the input signal, where n is a time index. The computer system may be coupled to (or incorporated within) a receiver that captures the samples and makes the samples available to the computer system.

At 215, the computer system computes the sixth order cumulant $C_{63}$ of the samples $\{y(n)\}$, e.g., as variously described above. In alternative embodiments, the computer system may compute some other cumulant (e.g., one of the sixth order cumulants other than $C_{63}$).

At 220, the computer system computes a skewness of a first sequence with respect to a frequency index j, e.g., as variously described above. (More generally, the computer system computes a measure of the asymmetry of the first sequence considered as a distribution.) The $j^{th}$ term of the first sequence may be determined by a correlation sum with respect to index k between Y'(k+P,j) and Y'(k,j), where the function Y'(k,j) is a magnitude spectrum derived from an initial spectrum B'(k,j) of the form $|DFT\{y^4(n+kN/2P)\}|$ by zeroing a maximum element from the initial spectrum. "DFT" denotes the discrete Fourier transform operator, e.g., an N/2P-point discrete Fourier transform operator. N is the number of the samples in the sequence $\{y(n)\}$. P is a positive integer less than N. (For example, P may be an integer factor of N.) In one embodiment, the first sequence is given by $\{E_k[Y'(k+P,j)Y'(k,j)^*]\}$, where $E_k$ denotes an expected value relative to the index k. (In alternative embodiments, the initial spectrum B'(k,j) may be computed based on an even power of the input signal samples other than the fourth power, e.g., the second power, the sixth power or the eight power.)

At 225, the computer system compares the sixth order cumulant $C_{63}$ and the skewness to respective thresholds to obtain respective comparison results, e.g., as variously described above.

At 230, the computer system classifies the modulation type of the input signal as being either BPSK or a member of a set S of modulation types, e.g., as described above. The set S includes a plurality of PSK and QAM modulation types but does not include BPSK. The classification is based on the comparison results.

In some embodiments, the computer system may display an indication of whether the modulation type of the input signal has been classified as BPSK or as a member of the set S. Software executing on the computer system preferably provides a graphical user interface through which the computer system may display output data in any of various forms (e.g., graphical and/or numerical forms) to the user.

In some embodiments, the computer system may scale the samples $\{y(n)\}$ of the input signal prior to the action of computing the sixth order cumulant $C_{63}$. The action of scaling the samples $\{y(n)\}$ normalizes the average power of the samples, i.e., causes the average power to equal a predetermined constant, e.g., as described above.

In some embodiments, the computer system may: performing BPSK demodulation on the samples $\{y(n)\}$ to recover information bits from the samples in response to the modulation type of the input signal being classified as BPSK; generate an output signal (e.g., a video signal and/or an audio signal) based on the information bits; and output the output signal to an output device, e.g., a display device and/or a set of speakers.

Figure 3:
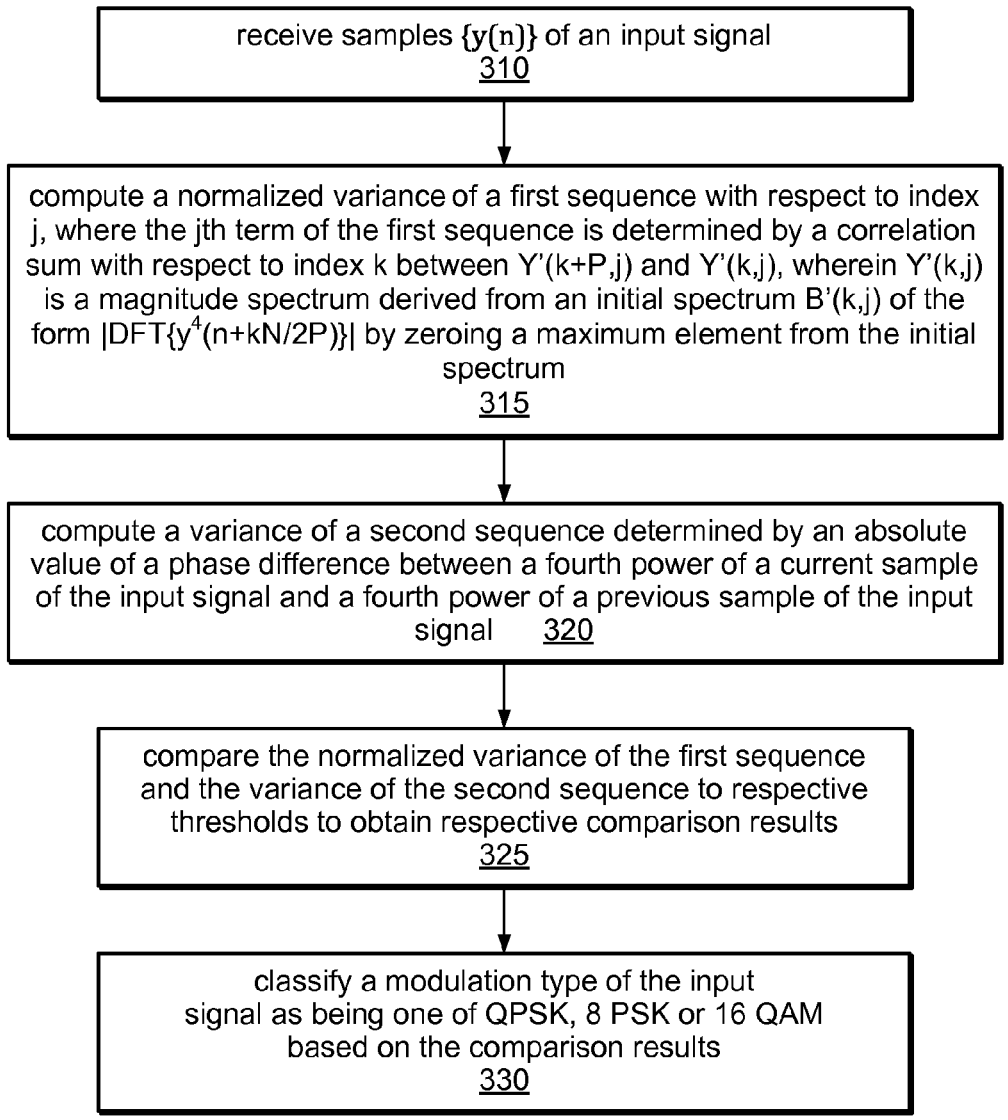
FIG. 3 illustrates one embodiment of a second method for classifying the modulation type and constellation order of a received input signal.

In one set of embodiments, a method for classifying the modulation type of an input signal involves the operations shown in FIG. 3. The method may be performed by a computer system (e.g., any of the various computer systems described herein).

At 310, the computer system receives samples $\{y(n)\}$ of the input signal, e.g., as variously described above. Index n is a time index.

At 315, the computer system computes a normalized variance of a first sequence relative to an index j, e.g., as variously described above. The $j^{th}$ term of the first sequence is determined by a correlation sum with respect to index k between Y'(k+P,j) and Y'(k,j), where Y'(k,j) is a magnitude spectrum derived from an initial spectrum B'(k,j) of the form $|DFT\{y^4(n+kN/2P)\}|$ by zeroing a maximum element from the initial spectrum. DFT denotes the discrete Fourier transform operator, e.g., an N/2P-point discrete Fourier transform. N is the number of samples in the sequence $\{y(n)\}$. P is a positive integer less than N. (For example, P may be an integer factor of N.) In one embodiment, the first sequence is given by $\{E_k[Y'(k+P,j)Y'(k,j)^*]\}$, where $E_k$ denotes an expected value with respect to the index k. (In alternative embodiments, the initial spectrum B'(k,j) may be computed based on an even power of the input signal samples other than the fourth power, e.g., the second power, the sixth power or the eighth power.)

At 320, the computer system computes a variance of a second sequence (e.g., as variously described above), where the second sequence is determined by an absolute value of a phase difference between a fourth power of a current sample of the input signal and a fourth power of a previous sample of the input signal. For example, in one embodiment, the second sequence is given by:

$$\{(2|\arg(y^4(n)(y^4(n-1))^*)|)\bmod(2\pi)\},$$

where arg(z) denotes the phase of the complex quantity z, where "mod" denotes modulo.

At 325, the computer system compares the normalized variance of the first sequence and the variance of the second sequence to respective thresholds to obtain respective comparison results, e.g., as variously described above.

At 330, the computer system classifies the modulation type of the input signal as being one of QPSK, 8 PSK or 16 QAM based on the comparison results, e.g., as variously described above.

In some embodiments, the computer system may also display an indication of modulation type determined by the classification (i.e., operation 330).

In some embodiments, the computer system scales the samples $\{y(n)\}$ of the input signal prior to the action of computing the normalized variance of the first sequence. The scaling is performed so that the average power of the samples $\{y(n)\}$ is equal to a predetermined constant (e.g., the constant one).

In some embodiments, the computer system may: perform demodulation on the samples $\{y(n)\}$ according to the modulation type determined by the classification, in order to recover information bits; generate an output signal (e.g., a video signal and/or an audio signal) based on the information bits; and output the output signal to an output device (e.g., a display device and/or a set of speakers).

Figure 4:
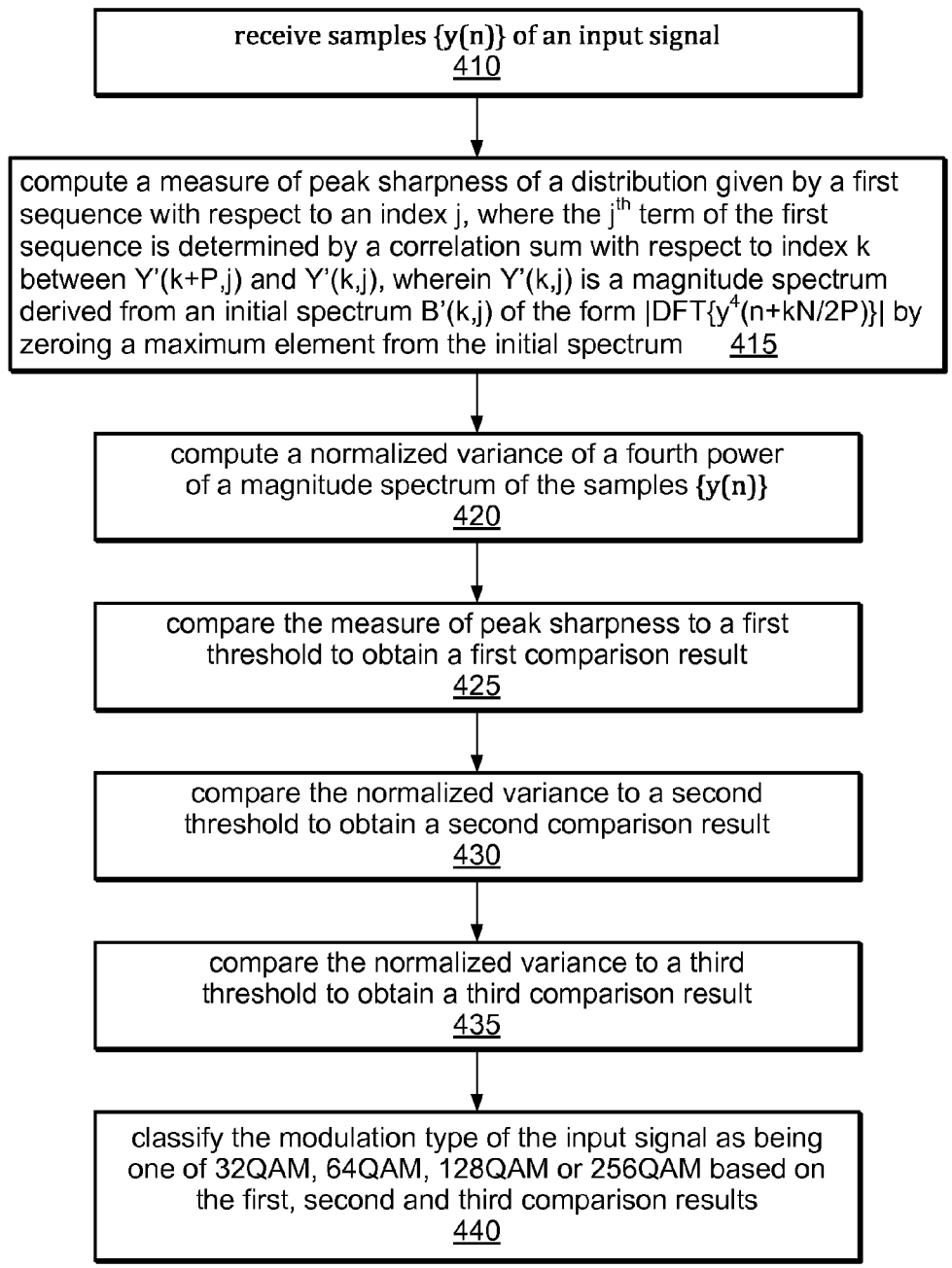
FIG. 4 illustrates one embodiment of a third method for classifying the modulation type and constellation order of a received input signal.

In one set of embodiments, a method for classifying the modulation type of an input signal involves the operations shown in FIG. 4. The method may be performed by a computer system (e.g., any of the various computer systems described herein).

At 410, the computer system receives samples $\{y(n)\}$ of the input signal. Index n is a time index.

At 415, the computer system computes a measure of peak sharpness (e.g., kurtosis or some other measure of peak sharpness) for a distribution given by a first sequence of numbers with respect to an index j, e.g., as variously described above. The $j^{th}$ term of the first sequence is determined by a correlation sum with respect to index k between Y'(k+P,j) and Y'(k,j), where Y'(k,j) is a magnitude spectrum derived from an initial spectrum B'(k,j) of the form $|\mathrm{DFT}\{y^4(n+kN/2P)\}|$ by zeroing a maximum element from the initial spectrum. DFT denotes a discrete Fourier transform operator, e.g., an N/2P-point discrete Fourier transform operator. N is the number of samples in the sequence $\{y(n)\}$. P is a positive integer less than N. (For example, P may be an integer factor of N.) In one embodiment, the first sequence is given by $\{E_k[Y'(k+P,j)Y'(k,j)]\}$, where $E_k$ denotes an expected value with respect to the index k. (In alternative embodiments, the initial spectrum B'(k,j) may be computed based on an even power of the input signal samples other than the fourth power, e.g., the second power, the sixth power or the eighth power.)

At 420, the computer system computes a normalized variance of a fourth power of a magnitude spectrum of the samples $\{y(n)\}$, e.g., as variously described above.

At 425, the computer system compares the measure of peak sharpness to a first threshold to obtain a first comparison result, e.g., as variously described above.

At 430, the computer system compares the normalized variance to a second threshold to obtain a second comparison result, e.g., as variously described above.

At 435, the computer system compares the normalized variance to a third threshold to obtain a third comparison result, e.g., as variously described above.

At 440, the computer system classifies the modulation type of the input signal as being one of 32QAM, 64QAM, 128QAM or 256QAM based on the first, second and third comparison results, e.g., as variously described above.

In some embodiments, the computer system may also display an indication of the modulation type determined by the classification.

In some embodiments, the computer system may scale the samples $\{y(n)\}$ of the input signal prior to the action of computing the measure of peak sharpness. The scaling may be performed so that the average power of the sample $\{y(n)\}$ is equal to a predetermined constant (e.g., the constant one).

In some embodiments, the computer system may: perform demodulation on the samples $\{y(n)\}$ according to the modulation type determined by the classification, in order to recover information bits; generate an output signal (e.g., a video signal and/or an audio signal) based on the information bits; and output the output signal to an output device (e.g., a display device and/or a set of speakers).

The following numbered paragraphs disclose additional embodiments.

1. A method comprising: receiving samples $\{x(n)\}$ of an input signal; scaling the samples $\{x(n)\}$ to obtain samples $\{y(n)\}$ having average power equal to a predetermined constant (e.g., one); computing a sixth order cumulant $C_{63}$ of the samples $\{y(n)\}$; computing a skewness relative to index j of a first sequence given by $\{E_k[Y'(k+P,j)Y'(k,j)^*]\}$, where $E_k$ denotes an expected value relative to index k, where Y'(k,j) is a magnitude spectrum derived from an initial spectrum of the form $|\mathrm{DFT}_{N/2P}\{y^4(n+kN/2P)\}|$ by deleting a maximum element from the initial spectrum, where $\mathrm{DFT}_{N/2P}$ denotes an N/2P-point discrete Fourier transform, where N is a number of said samples $\{y(n)\}$, where P is a positive integer less than N; comparing the sixth order cumulant $C_{63}$ and the skewness to respective thresholds to obtain respective comparison results; and classifying a modulation type of the input signal as being either BPSK or a member of a set of modulation types, wherein the set of modulation types includes a plurality of PSK and QAM modulation types other than BPSK, where said classifying the modulation type is performed based on the comparison results; displaying an indication of a result of said classifying.

2. A method comprising: receiving samples $\{x(n)\}$ of an input signal; scaling the samples $\{x(n)\}$ to obtain samples $\{y(n)\}$ having average power equal to a predetermined constant (e.g., one); computing a normalized variance relative to index j of a first sequence given by $\{E_k[Y'(k+P,j)Y'(k,j)^*]\}$, where $E_k$ denotes an expected value relative to index k, where Y'(k,j) is a magnitude spectrum derived from an initial spectrum of the form $|\mathrm{DFT}_{N/2P}\{y^4(n+kN/2P)\}|$ by deleting a maximum element from the initial spectrum, where $\mathrm{DFT}_{N/2P}$ denotes an N/2P-point discrete Fourier transform, where N is a number of said samples $\{y(n)\}$, where P is a positive integer less than N; computing a second variance of a second sequence given by $$\{(2|\arg(y^4(n)(y^4(n-1))^*)|)\%(2\pi)\};$$

comparing the normalized variance and the second variance to respective thresholds to obtain respective comparison results; classifying a modulation type of the input signal as being one of QPSK, 8PSK or 16QAM based on said comparison results; displaying an indication of a result of said classifying.

2B. The method of paragraph 2, further comprising: demodulating the input signal according to said classification of the modulation type to recover information bits, and driving an output device based on the information bits.

3. A method comprising: receiving samples $\{x(n)\}$ of an input signal; scaling the samples $\{x(n)\}$ to obtain samples $\{y(n)\}$ having average power equal to a predetermined constant (e.g., one); computing a kurtosis relative to index j of a first sequence given by $\{E_k[Y'(k+P,j)Y'(k,j)^*]\}$, where $E_k$ denotes an expected value relative to index k, where Y'(k,j) is a magnitude spectrum derived from an initial spectrum of the form $|DFT_{N/2P}\{y^4(n+kN/2P)\}|$ by deleting a maximum element from the initial spectrum, where $DFT_{N/2P}$ denotes an N/2P-point discrete Fourier transform, where N is a number of said samples $\{y(n)\}$, where P is a positive integer less than N; computing a normalized variance of a fourth power of a magnitude spectrum of the samples $\{y(n)\}$; performing a first comparison of the kurtosis to a first threshold to obtain a first comparison result; performing a second comparison of the normalized variance to a second threshold to obtain a second comparison result; performing a third comparison of the normalized variance to a third threshold to obtain a third comparison result; classifying a modulation type of the input signal as being one of 32QAM, 64QAM, 128QAM or 256QAM based on the first, second and third comparison results; displaying (or outputting or storing) an indication of a result of said classifying.

Figure 5:
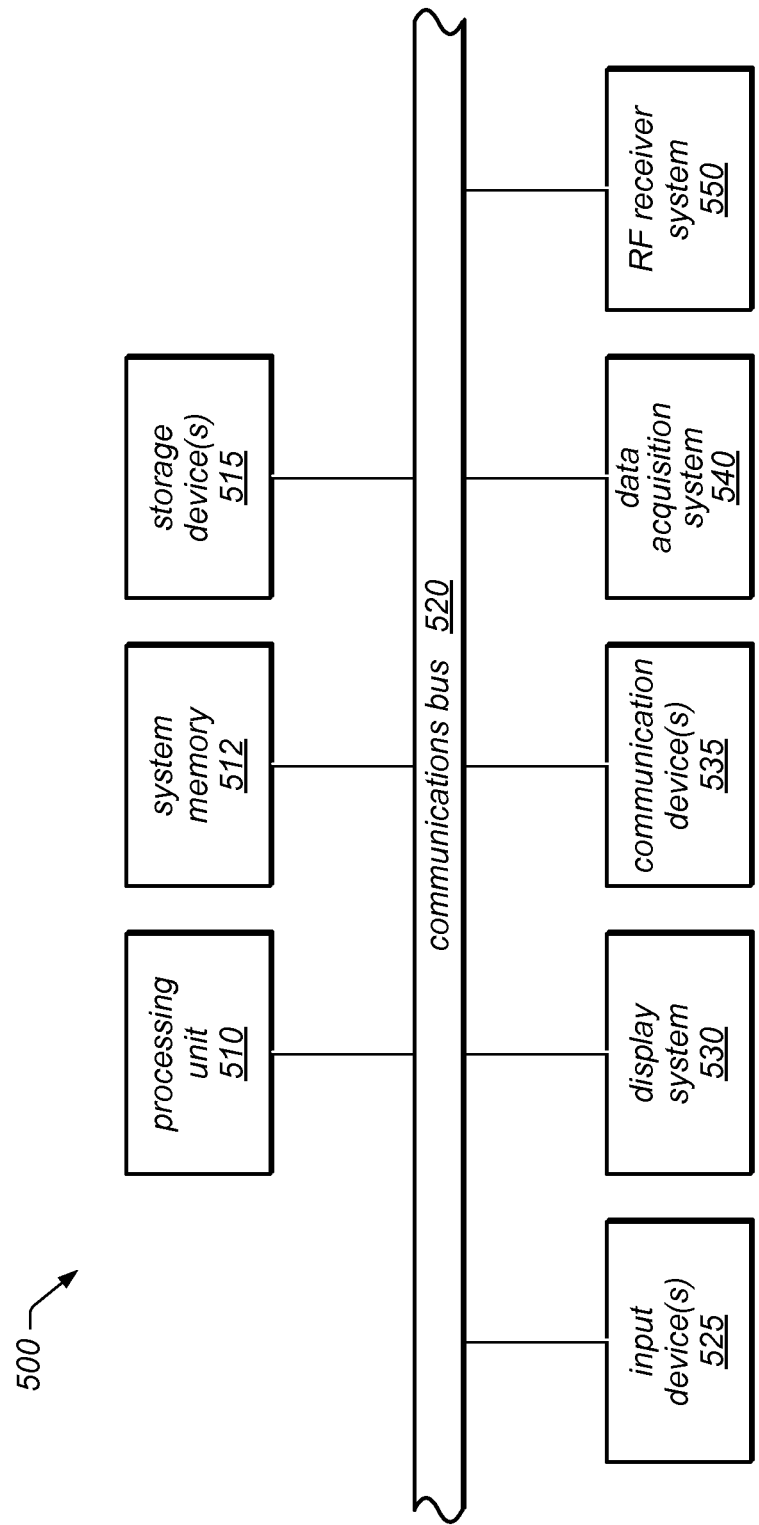
FIG. 5 illustrates one embodiment of a computer system may be used to perform any of the method embodiments described herein.

FIG. 5 illustrates one embodiment of a computer system 500 that may be used to perform any of the method embodiments described herein, or, any combination of the method embodiments described herein, or any subset of any of the method embodiments described herein, or, any combination of such subsets.

Computer system 500 may include a processing unit 510, a system memory 512, a set 515 of one or more storage devices, a communication bus 520, a set 525 of input devices, and a display system 530.

System memory 512 may include a set of semiconductor devices such as RAM devices (and perhaps also a set of ROM devices).

Storage devices 515 may include any of various storage devices such as one or more memory media and/or memory access devices. For example, storage devices 515 may include devices such as a CD/DVD-ROM drive, a hard disk, a magnetic disk drive, magnetic tape drives, etc.

Processing unit 510 is configured to read and execute program instructions, e.g., program instructions stored in system memory 512 and/or on one or more of the storage devices 515. Processing unit 510 may couple to system memory 512 through communication bus 520 (or through a system of interconnected busses). The program instructions configure the computer system 500 to implement a method, e.g., any of the method embodiments described herein, or, any combination of the method embodiments described herein, or, any subset of any of the method embodiments described herein, or any combination of such subsets.

Processing unit 510 may include one or more processors (e.g., microprocessors).

One or more users may supply input to the computer system 500 through the input devices 525. Input devices 525 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 500 may include other devices, e.g., devices such as one or more graphics accelerators, one or more speakers, a sound card, a video camera and a video card, a global positioning system (GPS) receiver, one or more accelerometers, a radio direction-finding system.

In some embodiments, computer system 500 may include one or more communication devices 535, e.g., a network interface card for interfacing with a computer network. In one embodiment, computer system 500 may receive an input signal and perform signal-processing operations on the input signal using such a communication device.

In some embodiments, the communication devices may include a reconfigurable I/O (RIO) board that includes one or more programmable hardware elements (PHEs), one or more analog-to-digital (A/D) converters and additional circuitry. The RIO board is programmable to achieve a user-desired configuration of input and/or output processing, e.g., via a program written using LabVIEW FPGA. In some embodiments, the additional circuitry of the RIO board may include circuitry optimized for various kinds of signal processing operations and/or circuitry configured for signal amplification, carrier signal generation and synchronization, clock signal generation and synchronization, RF down-conversion, any of various kinds of demodulation, etc. The RIO board may receive an input signal, down-convert the input signal to baseband, digitize the baseband signal, and make the digitized baseband samples available to the computer system 500 for further processing, e.g., processing according to any of the method embodiments disclosed herein.

In some embodiments, the reconfigurable I/O board is one of the RIO boards provided by National Instrument Corporation.

The computer system may be configured with a software infrastructure including an operating system, and perhaps also, one or more graphics APIs (such as OpenGL®, Direct3D, Java 3D™). In some embodiments, the software infrastructure may include LabVIEW and/or LabVIEW FPGA, which are software products of National Instruments Corporation.

In some embodiments, the computer system 500 may be configured for coupling to a data acquisition system 540. The data acquisition system 540 is configured to receive analog inputs signals, to digitize the analog input signals, and to make those digitized signals available to the computer system 500. The data acquisition system 540 may operate under the control of the software executing on processor 510.

In some embodiments, the computer system 500 may be configured to interface with a receiver system 550, e.g., a receiver system designed for capturing radiated electromagnetic signals (such as RF signals, wireless LAN signals, etc.), down-converting the captured signals, and sampling the down-converted signals. In one embodiment, the receiver system 550 may be realized by a vector signal analyzer such as the NI PXIe-5663 or the NI PXIe-5663E provided by National Instruments Corporation.

Figure 6:
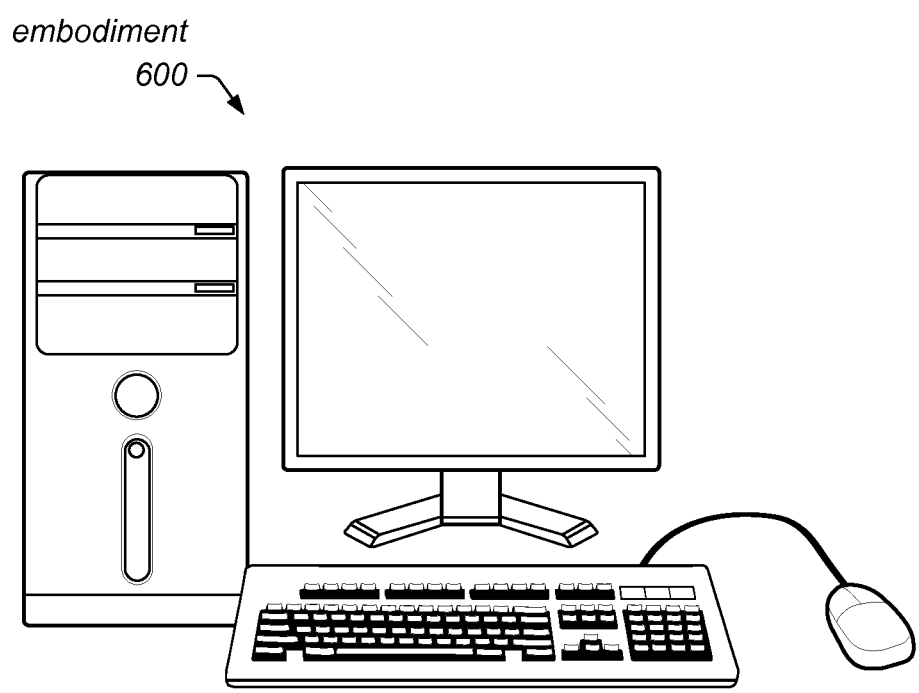
FIG. 6 illustrates one embodiment of the computer system 500 shown in FIG. 5.

FIG. 6 illustrates one possible embodiment 600 for computer system 500.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
utilizing a computer to perform:
receiving samples $\{y(n)\}$ of an input signal;
computing a sixth order cumulant $C_{63}$ of the samples $\{y(n)\}$;
computing a skewness of a first sequence relative to frequency index j, wherein the $j^{th}$ term of the first sequence is determined by a correlation sum with respect to index k between Y'(k+P,j) and Y'(k,j), wherein Y'(k,j) is a magnitude spectrum derived from an initial spectrum B'(k,j) of the form $|DFT\{y^4(n+kN/2P)\}|$ by zeroing a maximum element from the initial spectrum, wherein DFT denotes a discrete Fourier transformation, wherein N is a number of the samples $\{y(n)\}$, wherein P is a positive integer less than N;
comparing the sixth order cumulant $C_{63}$ and the skewness to respective thresholds to obtain respective comparison results; and
classifying a modulation type of the input signal as being either BPSK or a member of a set of modulation types, wherein the set of modulation types includes a plurality of PSK and QAM modulation types but does not include BPSK, wherein said classifying the modulation type of the input signal is based on the comparison results.

2. The method of claim 1, further comprising:
utilizing the computer to perform:
displaying an indication of whether the modulation type of the input signal has been classified as BPSK or as a member of the set of modulation types.

3. The method of claim 1, further comprising:
utilizing the computer to perform:
scaling the samples $\{y(n)\}$ of the input signal prior to said computing the sixth order cumulant $C_{63}$, wherein said scaling is performed so that an average power of the samples $\{y(n)\}$ equals a predetermined constant.

4. The method of claim 1, further comprising:
utilizing the computer to perform:
BPSK demodulating the samples $\{y(n)\}$ to recover information bits in response to the modulation type of the input signal being classified as BPSK;
generating an output signal based on the information bits; and
outputting the output signal to an output device.

5. A method comprising:
utilizing a computer to perform:
receiving samples $\{y(n)\}$ of an input signal;
computing a normalized variance of a first sequence relative to index j, wherein the $j^{th}$ term of the first sequence is determined by a correlation sum with respect to index k between Y'(k+P,j) and Y'(k,j), wherein Y'(k,j) is a magnitude spectrum derived from an initial spectrum B'(k,j) of the form $|DFT\{y^4(n+kN/2P)\}|$ by zeroing a maximum element from the initial spectrum, wherein DFT denotes a discrete Fourier transformation, wherein N is a number of said samples $\{y(n)\}$, wherein P is a positive integer less than N;
computing a second variance of a second sequence, wherein the second sequence is determined by an absolute value of a phase difference between a fourth power of a current sample of the input signal and a fourth power of a previous sample of the input signal;
comparing the normalized variance and the second variance to respective thresholds to obtain respective comparison results;
classifying a modulation type of the input signal as being one of QPSK, 8 PSK or 16 QAM based on said comparison results.

6. The method of claim 5, further comprising:
utilizing the computer to perform:
displaying an indication of modulation type determined by said classifying.

7. The method of claim 5, further comprising:
utilizing the computer to perform:
scaling the samples $\{y(n)\}$ of the input signal prior to said computing the normalized variance of the first sequence, wherein said scaling is performed so that an average power of the samples $\{y(n)\}$ equals a predetermined constant.

8. The method of claim 5, further comprising:
utilizing the computer to perform:
demodulating the samples $\{y(n)\}$ according to the modulation type determined by said classifying in order to recover information bits;
generating an output signal based on the information bits; and
outputting the output signal to an output device.

9. A method comprising:
utilizing a computer to perform:
receiving samples $\{y(n)\}$ of an input signal;
computing a measure of peak sharpness for a distribution given by a first sequence with respect to index j, wherein the $j^{th}$ term of the first sequence is determined by a correlation sum with respect to index k between Y'(k+P,j) and Y'(k,j), wherein Y'(k,j) is a magnitude spectrum derived from an initial spectrum B'(k,j) of the form $|DFT\{y^4(n+kN/2P)\}|$ by zeroing a maximum element from the initial spectrum, wherein DFT denotes a discrete Fourier transform, wherein N is a number of said samples $\{y(n)\}$, wherein P is a positive integer less than N;
computing a normalized variance of a fourth power of a magnitude spectrum of the samples $\{y(n)\}$;
performing a first comparison of the measure of peak sharpness to a first threshold to obtain a first comparison result;
performing a second comparison of the normalized variance to a second threshold to obtain a second comparison result;
performing a third comparison of the normalized variance to a third threshold to obtain a third comparison result;
classifying a modulation type of the input signal as being one of 32 QAM, 64 QAM, 128 QAM or 256 QAM based on the first, second and third comparison results.

10. The method of claim 9, further comprising:
utilizing the computer to perform:
displaying an indication of the modulation type determined by said classifying.

11. The method of claim 9, further comprising:
utilizing the computer to perform:
scaling the samples $\{y(n)\}$ of the input signal prior to said computing the measure of peak sharpness, wherein said scaling is performed so that an average power of the sample $\{y(n)\}$ equals a predetermined constant.

12. A non-transitory computer-readable memory medium storing program instructions, wherein the program instructions, when executed by a computer system, cause the computer system to:
- receive samples $\{y(n)\}$ of an input signal;
- compute a sixth order cumulant $C_{63}$ of the samples $\{y(n)\}$;
- compute a skewness of a first sequence relative to frequency index j, wherein the $j^{th}$ term of the first sequence is determined by a correlation sum with respect to index k between Y'(k+P,j) and Y'(k,j), wherein Y'(k,j) is a magnitude spectrum derived from an initial spectrum B'(k,j) of the form $|DFT\{y^4(n+kN/2P)\}|$ by zeroing a maximum element from the initial spectrum, wherein DFT denotes a discrete Fourier transformation, wherein N is a number of the samples $\{y(n)\}$, wherein P is a positive integer less than N;
- compare the sixth order cumulant $C_{63}$ and the skewness to respective thresholds to obtain respective comparison results; and
- classify a modulation type of the input signal as being either BPSK or a member of a set of modulation types, wherein the set of modulation types includes a plurality of PSK and QAM modulation types but does not include BPSK, wherein said classifying the modulation type of the input signal is based on the comparison results.

13. The memory medium of claim 12, wherein the program instructions, when executed by the computer system, further cause the computer system to:
- display an indication of whether the modulation type of the input signal has been classified as BPSK or as a member of the set of modulation types.

14. The memory medium of claim 12, wherein the program instructions, when executed by the computer system, further cause the computer system to:
- scale the samples $\{y(n)\}$ of the input signal prior to said computing the sixth order cumulant $C_{63}$, wherein said scaling is performed so that an average power of the samples $\{y(n)\}$ equals a predetermined constant.

15. The memory medium of claim 12, wherein the program instructions, when executed by the computer system, further cause the computer system to:
- perform BPSK demodulation on the samples $\{y(n)\}$ to recover information bits in response to the modulation type of the input signal being classified as BPSK;
- generate an output signal based on the information bits; and
- output the output signal to an output device.

16. A non-transitory computer-readable memory medium storing program instructions, wherein the program instructions, when executed by a computer system, cause the computer system to:
- receive samples $\{y(n)\}$ of an input signal;
- compute a normalized variance of a first sequence relative to index j, wherein the $j^{th}$ term of the first sequence is determined by a correlation sum with respect to index k between Y'(k+P,j) and Y'(k,j), wherein Y'(k,j) is a magnitude spectrum derived from an initial spectrum B'(k,j) of the form $|DFT\{y^4(n+kN/2P)\}|$ by zeroing a maximum element from the initial spectrum, wherein DFT denotes a discrete Fourier transformation, wherein N is a number of said samples $\{y(n)\}$, wherein P is a positive integer less than N;
- compute a second variance of a second sequence, wherein the second sequence is determined by an absolute value of a phase difference between a fourth power of a current sample of the input signal and a fourth power of a previous sample of the input signal;
- compare the normalized variance and the second variance to respective thresholds to obtain respective comparison results; and
- classify a modulation type of the input signal as being one of QPSK, 8 PSK or 16 QAM based on said comparison results.

17. The memory medium of claim 16, wherein the program instructions, when executed by the computer system, further cause the computer system to:
- display an indication of modulation type determined by said classifying.

18. The memory medium of claim 16, wherein the program instructions, when executed by the computer system, further cause the computer system to:
- perform demodulation on the samples $\{y(n)\}$ according to the modulation type determined by said classifying in order to recover information bits;
- generate an output signal based on the information bits; and
- output the output signal to an output device.

19. A non-transitory computer-readable memory medium storing program instructions, wherein the program instructions, when executed by a computer system, cause the computer system to:
- receive samples $\{y(n)\}$ of an input signal;
- compute a measure of peak sharpness for a distribution given by a first sequence with respect to index j, wherein the $j^{th}$ term of the first sequence is determined by a correlation sum with respect to index k between Y'(k+P, j) and Y'(k,j), wherein Y'(k,j) is a magnitude spectrum derived from an initial spectrum B'(k,j) of the form $|DFT\{y^4(n+kN/2P)\}|$ by zeroing a maximum element from the initial spectrum, wherein DFT denotes a discrete Fourier transform, wherein N is a number of said samples $\{y(n)\}$, wherein P is a positive integer less than N;
- compute a normalized variance of a fourth power of a magnitude spectrum of the samples $\{y(n)\}$;
- perform a first comparison of the measure of peak sharpness to a first threshold to obtain a first comparison result;
- perform a second comparison of the normalized variance to a second threshold to obtain a second comparison result;
- perform a third comparison of the normalized variance to a third threshold to obtain a third comparison result; and
- classify a modulation type of the input signal as being one of 32 QAM, 64 QAM, 128 QAM or 256 QAM based on the first, second and third comparison results.

20. The memory medium of claim 19, wherein the program instructions, when executed by the computer system, further cause the computer system to:
- display an indication of the modulation type determined by said classifying.

21. The memory medium of claim 19, wherein the program instructions, when executed by the computer system, further cause the computer system to:
- perform demodulation on the samples $\{y(n)\}$ according to the modulation type determined by said classifying, in order to recover information bits;
- generate an output signal based on the information bits; and
- output the output signal to an output device.

* * * * *